United States Patent
Li et al.

(10) Patent No.: US 9,411,433 B2
(45) Date of Patent: Aug. 9, 2016

(54) WHITEBOARD DISPLAY

(71) Applicant: Lenovo (Singapore) Pte. Ltd., Singapore (SG)

(72) Inventors: Scott Wentao Li, Cary, NC (US); Zhenglong Bai, Cary, NC (US); Russell Speight VanBlon, Raleigh, NC (US); Axel Ramirez Flores, Durham, NC (US); Joshua Neil Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 86 days.

(21) Appl. No.: 14/283,884

(22) Filed: May 21, 2014

(65) Prior Publication Data
US 2015/0338929 A1    Nov. 26, 2015

(51) Int. Cl.
G06F 3/041    (2006.01)
G06F 3/03    (2006.01)
G06F 3/0354    (2013.01)
G06F 3/038    (2013.01)

(52) U.S. Cl.
CPC ............ *G06F 3/0317* (2013.01); *G06F 3/0304* (2013.01); *G06F 3/038* (2013.01); *G06F 3/0321* (2013.01); *G06F 3/03545* (2013.01); *G06F 3/041* (2013.01)

(58) Field of Classification Search
CPC .............................................. G06F 2203/0384
USPC ........................................................ 345/173
See application file for complete search history.

(56) References Cited

U.S. PATENT DOCUMENTS

2011/0227827 A1*   9/2011   Solomon ............... G06F 3/0321
                                                                  345/158

* cited by examiner

*Primary Examiner* — Gustavo Polo
(74) *Attorney, Agent, or Firm* — Schwegman, Lundberg & Woessner, P.A.

(57) ABSTRACT

A method includes receiving an image of a display surface from a pointing device having a camera with a field of view wider than a tip of the pointing device, processing the received image to identify an area on the display surface within the field of view of the camera, and identifying a position of the tip of the pointing device on the display surface as a function of the identified area on the display surface.

18 Claims, 5 Drawing Sheets

WHITEBOARD DISPLAY

BACKGROUND

Interactive whiteboards generally utilize a sensing surface coupled to a computer to detect where a stylus is interacting with the surface. Different technologies, such as infrared scan type whiteboards detect where a pointer or stylus is based on interference with infrared light at the whiteboard surface. Software may be used to triangulate the position of the pointer or stylus. Resistive touch whiteboards utilize a resistive membrane on the surface of the whiteboard to sense where a person is drawing. Electromagnetic based whiteboards utilize an array of wires in the whiteboard that interact with a coil in a passive pen. Other types of whiteboards operate on different principles, including projector based. Such whiteboards can be fairly expensive and dedicated to a single whiteboard purpose.

SUMMARY

A method includes receiving an image of a display surface from a pointing device having a camera with a field of view wider than a tip of the pointing device, processing the received image to identify an area on the display surface within the field of view of the camera, and identifying a position of the tip of the pointing device on the display surface as a function of the identified area on the display surface A machine readable storage device has instructions for execution by a processor of the machine to perform receiving an image of a display surface from a pointing device having a camera with a field of view wider than a tip of the pointing device, processing the received image to identify an area on the display surface within the field of view of the camera, and identifying a position of the tip of the pointing device on the display surface as a function of the identified area on the display surface.

A device includes a processor and a memory device having a program stored thereon for execution by the processor to receive an image of a display surface from a pointing device having a camera with a field of view wider than a tip of the pointing device, process the received image to identify an area on the display surface within the field of view of the camera, and identify a position of the tip of the pointing device on the display surface as a function of the identified area on the display surface.

A device includes a display, a processor operatively coupled to the display, and a memory device having a program stored thereon for execution by the processor to receive an image of a display surface from a camera of a pointing device, the image having a field of view wider than a tip of the pointing device, process the received image to identify an area on the display surface within the field of view of the camera, and identify a position of the tip of the pointing device on the display surface as a function of the identified area on the display surface.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A display device such as a television may be used as a white board via the use of a dongle plugged into or otherwise communicatively coupled to the display device and a pointing device with a camera that provides images of a surface of the display. The term, dongle, is used to represent computing devices with I/O capabilities suitable for driving a display. The processing circuitry is used to receive an image of the display surface from the pointing device which has a camera with a field of view wider than and through a clear tip of the pointing device. The received image is processed to identify unique hashed mapped zones on the display surface within the field of view of the camera. A position of the tip of the pointing device on the display surface is identified as a function of the unique hashed mapped zones. The pointing device may also detect when a user is attempting to draw, and provides the position information to the circuitry to display corresponding drawing content on the display.

Figure 1:
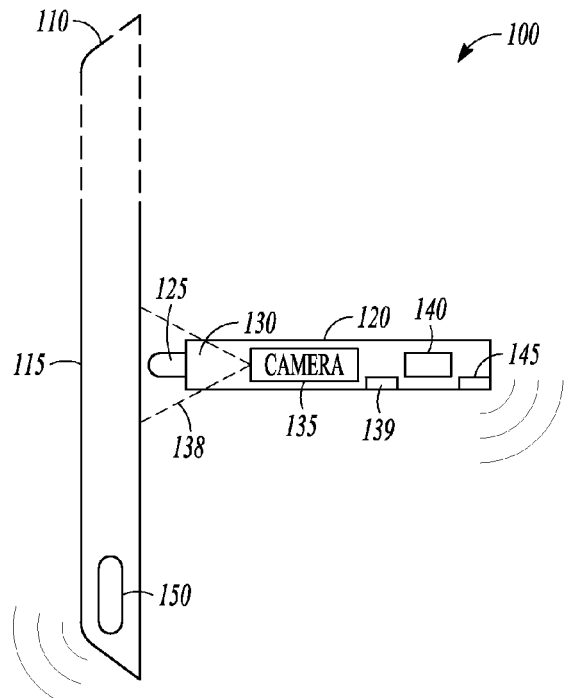
FIG. 1 is a block diagram of a display device and pointing device to implement a whiteboard according to an example embodiment.

FIG. 1 is a block diagram of a system 100 for implementing whiteboard functionality on a display device 110. The display device 110 includes a screen or display surface 115 which need not be modified via additional sensors or other constructs to operate as a whiteboard and interact with a pointing device such as a pointing device 120. Pointing device 120 may be a pen or other structure that serves to space the pointing device 120 from the drawing surface and identify where the pointing device 120 will draw on the display surface 115.

The pointing device 120 may include a transparent tip 125 and also includes a case 128, which may be shaped as desired to provide a comfortable pointing/writing device for users. A portion 130 of the case 128 proximate the tip 125 may also be transparent to facilitate a camera 135 field of view 138. In one embodiment, the camera 135 is disposed within the case 128 having suitable lenses and image capture circuitry to capture images within the field of view 138 (indicated by broken lines). The field of view 138 is wide enough to capture pixels extending beyond a point where the tip is positioned proximate or touching the display surface 115. Pointing device 120 may also include a battery 139 to power circuitry within the pointing device. In further embodiments, one or more cameras may be supported by the pointing device in a manner such that portions of the pointing device need not be transparent. Mounting the camera on an outside of the pointing device is one such example.

The pointing device 120 may include a tilt sensor 140 to indicate an angle from perpendicular that the pointing device 120 is being held in relation to the display surface 115. The angle defines the shape of the field of view 138 on the display surface 115. When the pointing device 120 is orthogonal to the display surface 115, the field of view 138 corresponds to a circle on the display surface 115. A tilt of the pointing device 120 from perpendicular to the display surface 115 results in an elliptical type of footprint of the field of view 138 on the display surface 115. The tilt is accounted for in determining where a line should appear when a user attempts to draw using Euclidean geometry based algorithms in one embodiment.

A transmitter or transceiver 145 in the pointing device 120 may implement a wireless communication protocol, such as Bluetooth, to communicate with a dongle 150 that is coupled to display 110 such as via a USB port, HDMI port, or GPU also represented at 150. The dongle 150 may include a general purpose processor, and in further embodiments may correspond to a computer system coupled to the display device 110. Dongle 150 provides signals to the display device 110 to define an image to display on display surface 115, as well as markers to identify position on the display surface.

Images from the camera, or proximity sensors, such as a capacitive sensor included in the tip 125 of the pointing device can be used to detect when the pointing device is close to or touching the display surface 115 to infer that a user is intending to create lines or other types of marks on the display surface 115. While the pointing device is at such a distance and moving, multiple points on the display surface are identified and communicated back through the dongle and processed such that the lines are displayed between the identified points.

Figure 2:
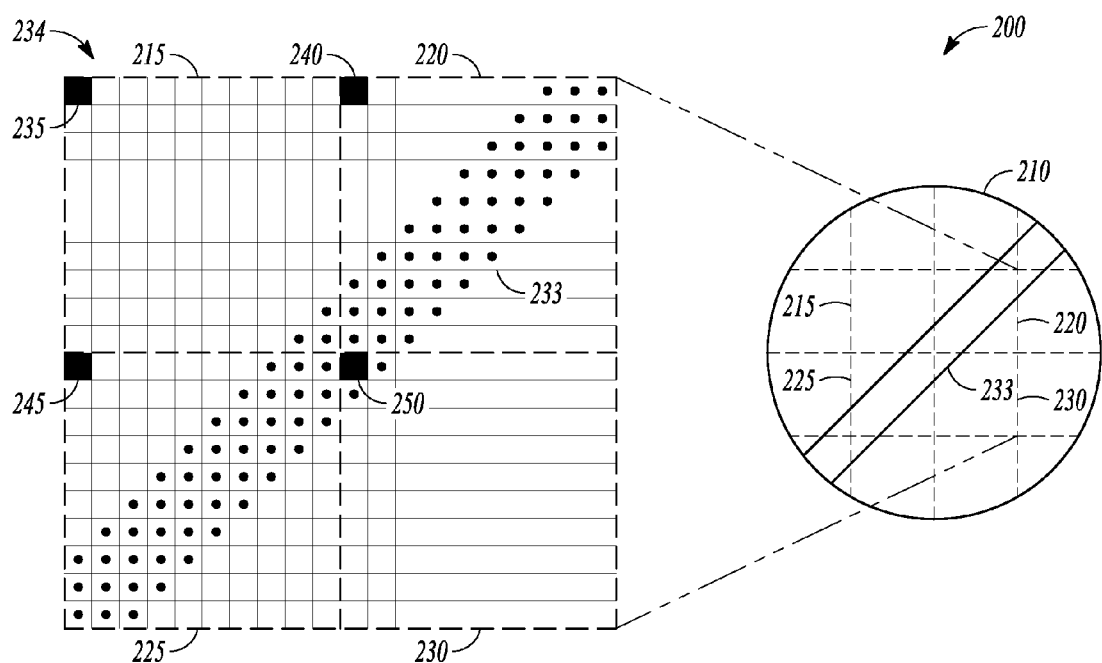
FIG. 2 is a representation of zones of a camera image from a pointing device according to an example embodiment.

FIG. 2 at 200 illustrates a circular field of view 210 from which position on the display surface may be identified. In one embodiment, several zones 215, 220, 225, and 230 are shown within the field of view 210. Each zone in one embodiment corresponds to 100 pixels arranged in a 10×10 array of pixels. Field of view 210 includes a line 233 drawn through multiple zones. The pixels corresponding to the line are shown as dots rather than fully colored in pixels to facilitate illustration of the embodiments. Further detail of four of the zones 215, 220, 225, 230 is shown in a blown up portion of the field of view indicated generally at 234. In one embodiment, the size of the zone may be dynamically adjusted to optimize accuracy of pen tip position, and to accommodate different resolutions of displays. For example, the method would work equally well on a 4K display as a 1080P display.

A zone marker 235, 240, 245, 250 is shown in each zone to identify the zone. Note that zone marker 250 is more easily viewable given the use of dots for the line 233. In one embodiment, the zone marker may be located in an upper left corner of each zone, and may comprise a single pixel. The zone markers may have a color and intensity that is not visible or less discernible to an average user, and may be located in different portions of the zone or adjacent to the zone in different embodiments. A less discernible zone marker is a marker that may be somewhat visible, but does not significantly interfere with perception of content on the display. A marker may be less discernible if it is very small, such as a single pixel, and may also have a color and/or brightness that are more subdued.

The line 133 is illustrated in further detail on a pixel by pixel basis in the blown up portion 234. Each pixel has a color depth and a brightness in one embodiment. The position of each zone is defined by the zone marker, allowing the correlation of camera images with actual pixels in the zones on the display device. This allows the actual pixel information to be derived from the camera image, converted to an array of pixel information which is hashed. That hash is used to precisely identify the zone from a zone hash table.

Figure 3:
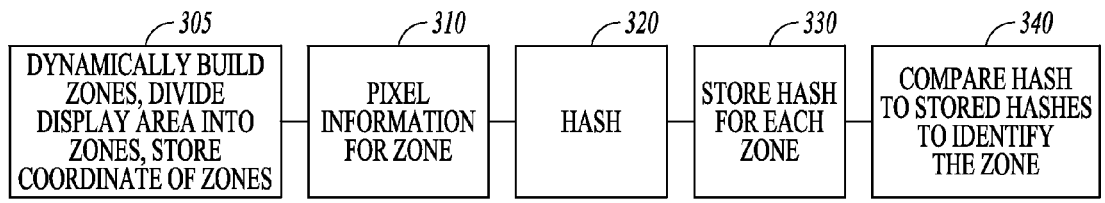
FIG. 3 is a flowchart illustrating a method of calculating hashes for zones on a display device according to an example embodiment.

A method 300 in FIG. 3 is used to uniquely identify a zone on a display screen that has been divided into an array of zones. Method 300 creates both a stored list of zones and hashes for each zone generated via a video buffer containing information to be displayed to create the zone hash table. Method 300 may also utilize the same hash algorithm to generate a hash for each zone in the field of view of the camera of the pointing device.

At 305, method 300 may dynamically build zones and adjust the size of the zone to optimize accuracy of pen tip position, and to accommodate different resolutions of displays. The zones may be built by dividing the display area into zones and storing the coordinates of each zone. The pixel information for each zone is converted into an array or vector of bytes at 310. The bytes from each zone are used to generate a hash for each zone as indicated at 320. The hash should be unique for each zone. The hash for each zone is then stored in the zone hash table at 330. If the hash for a zone is derived from the image, it may be compared at 340 to the stored hashes in the zone hash table for the display to identify the zone in the field of view of the camera. This process is done for each new drawing session on the display surface 115 to create a hash zone table for each drawing, and facilitate zone identification from pointing device camera images.

Zones may be identified by its zone marker position in pixel coordinates. For instance, zone marker 235, corresponding to zone 215 has pixel coordinate 10,10. Zone marker 24 is coordinate 10, 20, zone marker 245 is coordinate 20,10, and zone marker 150 is coordinate 20,20. The corresponding hash for each zone may be UH1, UH2, UH3, and UH4 respectively. These zone marker and hash values may be stored in the zone hash table for the entire display surface as indicated at 330. When a hash is then generated from a zone identified via the camera image, that hash is used to index into the zone hash table to identify the zone. Thus if the hash of a zone from the camera image is UH3, it will map to zone coordinate 20,10 corresponding to zone marker 245.

Figure 4:
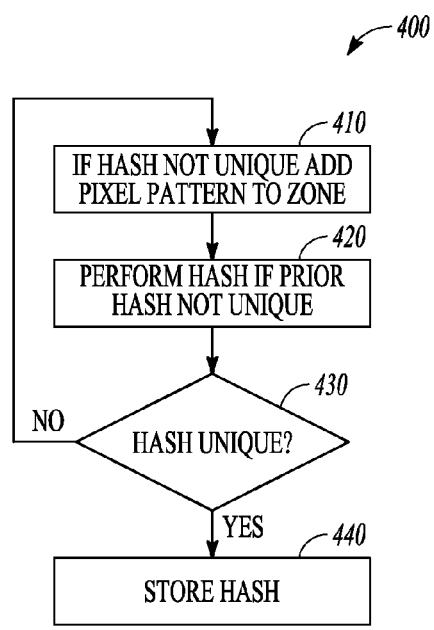
FIG. 4 is a flowchart illustrating a method of ensuring a unique has for each zone on a display screen according to an example embodiment.

FIG. 4 is a flowchart illustrating a method 400 of ensuring that each zone has a unique hash such that the zone hash table contains no identical hashes. The methods described herein may be performed by the dongle 150 or another computer system coupled to the display device 110 to receive pixel information for the entire display that has been divided into an appropriate number of zones. Note that zone 230 contains three pixels corresponding to the line 233, where zone 234 contains six pixels. The hashes of bytes of pixel information from these zones will very likely be unique. Zones 220 and 225 both have quite a few pixels corresponding to line 233, and will also likely have unique hashes. However, on the off chance that they do not, additional pixels may be colored in at 410 in a manner that is not normally perceptible to the user and may be not visible or less discernible to the user in the same manner as the zone markers. The hash may then be redone at 420 for that zone to ensure it is still unique. For all zones that only contain no color or intensity variations, similar human imperceptible or less discernible pixel patterns may be added, either randomly or methodically until each zone has a unique hash. At 430, a check is done to see if the hash is now unique. If no, the process repeats at 410. If yes, the hash is stored at 440. An MD5 hash or other suitable hash may be used in various embodiments for both this initial generation of the zone hash table and for generating hashes for zones in the field of view of the pointing device camera to compare against the table.

Figure 5:
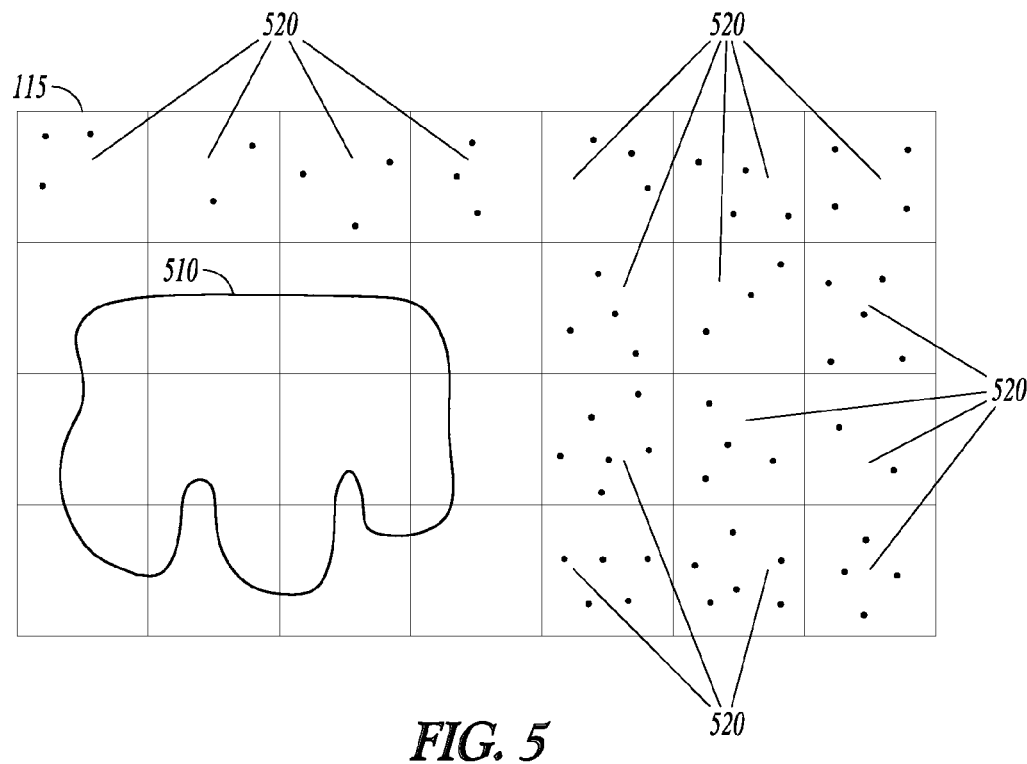
FIG. 5 is a representation of a display screen having zones according to an example embodiment.

FIG. 5 illustrates screen 115 with multiple zones having patterns added to ensure different hashes for each zone. Note that the zone sizes are exaggerated to provide a better conceptual framework and a typical screen display will have many more zones than those shown for this example. A drawing 510 is shown occupying several zones. Those zones do not need to have added patterns, whereas other zones indicated at 520 are provided with added patterns that are not perceptible to the user in one embodiment. Note that in some embodiments, such patterns may be marginally perceptible to users while not interfering with usability of the display screen as a whiteboard. Imperceptible patterns may be obtained by adding minor variations in intensity of one or more pixels in some embodiments. Minimal color variations may also be introduced to form the patterns.

Figure 6:
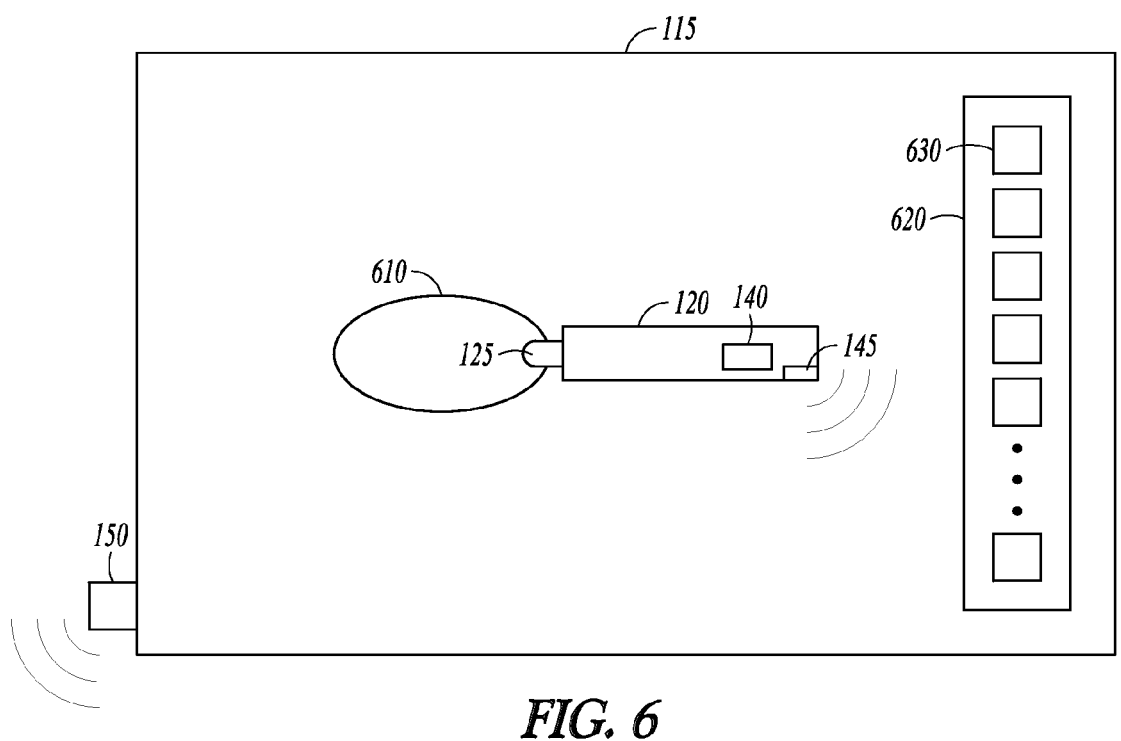
FIG. 6 is a representation of a display screen and tilted pointing device to implement a whiteboard according to an example embodiment.

FIG. 6 illustrates screen 115 showing pointing device 120 tilted at an angle to the screen resulting in an elliptical field of view 610. Tilt sensor 140 provides tilt information via transceiver 145 to dongle 150 to allow circuitry to calculate a center coordinate of identified hash zones in the field of view corresponding to the tip 125 of the pointing device 120. In this case, the pointing device appears to be tilted at a significant angle from perpendicular, resulting in the center being toward the far right side of the field of view 610. The precise math used to calculate the center may depend on the size of the field of view and the distance of the camera to the tip 125.

A whiteboard application interface is illustrated at 620 in the form of a strip of icons 630, which may each correspond to different functions and commands that may be selected utilizing the pointing device. The interface 620 may be identified by the zones that they are residing in and such zones and pointing device position may be determined in the same manner as the pointing device position on any other point on the screen 115.

The interface, and functions performed via the interface may be generated by a whiteboard app or application running on the dongle or a computer system in various embodiments. The application provides whiteboard functions, position mapping, and may provide remote share and broadcast functions via a network layer. Further functions include saving screen information locally and remotely, such as in a cloud computing environment.

Position mapping may be provided by overlaying a position map on top of video buffer images. Once the display has been divided into zones and uniquely hashed, various zones may be hashed again if changes are made to the zones. Then, the zones that changed are hashed, while unchanged zones may not be hashed again. While zones are described as 10×10 arrays of pixels, other size zones may be used, such as 20×20 arrays of pixels. The size of the zones may be restricted by the field of view of the camera. As shown, the field of view should be wide enough to capture multiple zones. In one embodiment, the field of view is wide enough to capture at least four zones. The size of the zones may be directly proportional to the size of the field of view in some embodiments.

In further embodiments, the images provided by the camera may be compared directly to images being provided to the display surface via the dongle or other computing device in order to determine the position of the pointing device.

Figure 7:
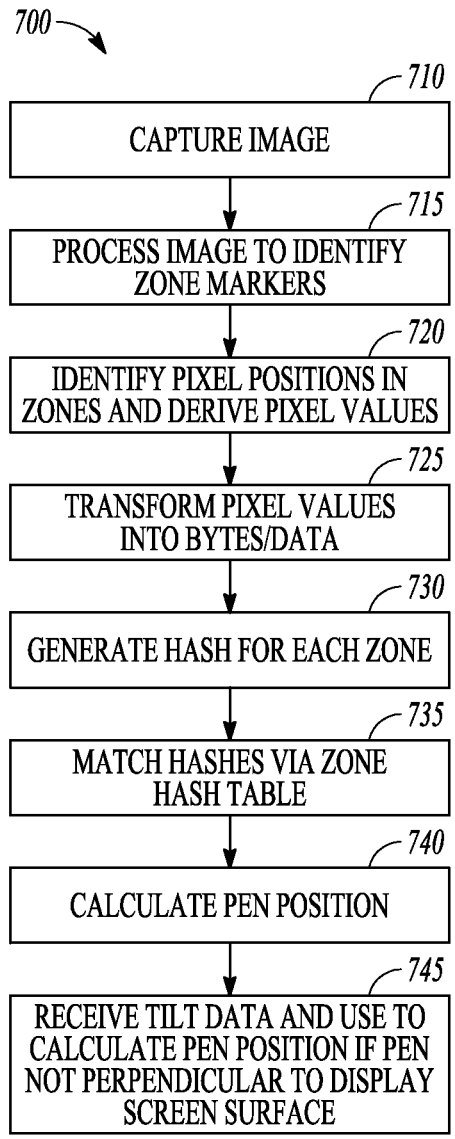
FIG. 7 is a flowchart illustrating a method to identify a zone location according to an example embodiment.

FIG. 7 is a flowchart illustrating a method 700 of determining pointing device position. At 710, an image captured by the pointing device camera is provided to the dongle. The image is processed by identifying the zones via the zone markers at 715. Once the zones are identified, the pixel positions in the zones are identified and values are derived for each corresponding pixel in each zone at 720. The coordinates of each/any pixel in the zone can be computed from the coordinate of the zone, which is looked up from the hash position map. The pixel values are then transformed into vector data in the form of bytes at 725. The bytes are then run through the hash algorithm to generate a hash for each zone at 730. The hashes are matched at 735 with previous hashes from the zone hash table obtained from the data being displayed on the screen to determine the pointing device position, which may be calculated at 740 from a center position of the zones in the field of view. Tilt sensor data may also be received and taken into account at 745 when the pointing device is not held perpendicular to the display surface.

Figure 8:
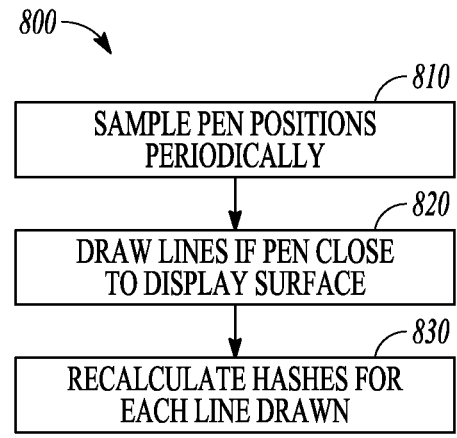
FIG. 8 is a flowcharting illustrating a method to draw lines according to an example embodiment.

Movement of the pointing device may be determined as shown in FIG. 8 via a method 800. The pointing device positions are sampled at a set number of times per second at 810 to generate multiple different pointing device positions if the pointing device has been moved between samples. If the pointing device is close to the display surface, lines may be drawn at 820 between sampled positions. As the lines are drawn, hashes may be recalculated at 830, both based on the displayed pixels to update the zone hash table, and the information from the camera to recalculate the position of the pointing device. Only the zones on the display surface that changed are recalculated in one embodiment.

Figure 9:
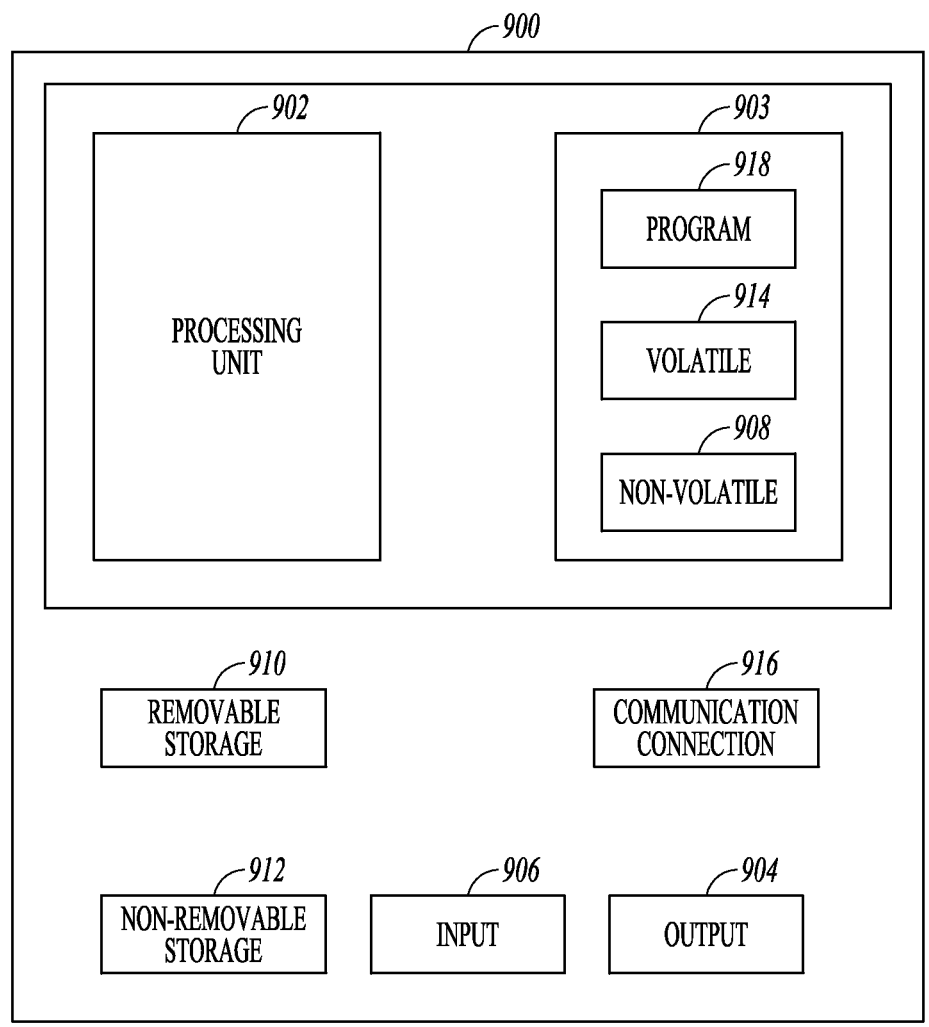
FIG. 9 is a block diagram of processing circuitry used to implement methods according to an example embodiment.

FIG. 9 is a block schematic diagram of processing circuitry in the form of a computer system 900 to implement one or more of the devices described, such as dongle 150, and other computing resources according to example embodiments. All components need not be used in various embodiments. One example computing device in the form of a computer 900 may include a processing unit 902, memory 903, removable storage 910, and non-removable storage 912. Sensors 115 and 125 may be coupled to provide data to the processing unit 902. Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 900 may include or have access to a computing environment that includes input 906, output 904, and a communication connection 916. Output 904 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 900. A hard drive, CD-ROM, and RAM are some examples of articles including a non-transitory computer-readable medium. For example, a computer program 918 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers.

EXAMPLES

1. A method comprising:
receiving an image of a display surface from a pointing device having a camera with a field of view wider than a tip of the pointing device;
processing the received image to identify an area on the display surface within the field of view of the camera; and
identifying a position of the tip of the pointing device on the display surface as a function of the identified area on the display surface.

2. The method of example 1 wherein the image is received via processing circuitry that processes the image, identifies the position of the tip of the pointing device, and drives the display.

3. The method of any of examples 1-2 wherein processing the received image to identify an area on the display surface comprises:
detecting markers displayed on the display surface corresponding to unique hashed mapped zones;
transforming pixel information in each mapped zone in the field of view into a hash; and
comparing the hashes to known hashes to identify a mapped zone corresponding to the position of the tip of the pointing device.

4. The method of example 3 wherein pixel information transformed into the hash comprises pixel brightness and color depth.

5. The method of any of examples 3-4 wherein the markers comprise a marker pixel in each zone.

6. The method of example 5 wherein marker pixel is less discernible to a human user.

7. The method of any of examples 3-6 wherein a pixel pattern is added to each zone having a non-unique hash until the hash for each zone is unique.

8. The method of example 7 wherein each zone on the display has a hash stored in a memory device as the known hashes.

9. The method of any of examples 3-8 and further comprising:
receiving tilt information from the pointing device; and
using the tilt information in combination with the unique hashed mapped zones within the field of view of the camera to determine a position of the tip of the pointing device in such zones.

10. The method of any of examples 3-9 and further comprising dynamically adjusting a size of the zone to optimize accuracy of pen tip position, and to accommodate different resolutions of displays.

11. A machine readable storage device having instructions for execution by a processor of the machine to perform:
receiving an image of a display surface from a pointing device having a camera with a field of view wider than a tip of the pointing device;
processing the received image to identify an area on the display surface within the field of view of the camera; and
identifying a position of the tip of the pointing device on the display surface as a function of the identified area on the display surface.

12. The machine readable storage device of example 11 wherein processing the received image to identify an area on the display surface comprises:
detecting markers displayed on the display surface corresponding to unique hashed mapped zones;
transforming pixel information in each mapped zone in the field of view into a hash; and
comparing the hashes to known hashes to identify a mapped zone corresponding to the position of the tip of the pointing device.

13. The machine readable storage device of example 12 wherein pixel information transformed into the hash comprises pixel brightness and color depth and wherein the markers comprise a marker pixel in each zone.

14. The machine readable storage device of any of examples 12-13 wherein each zone on the display has a hash stored in a memory device as the known hashes.

15. The machine readable storage device of any of examples 12-13 wherein the machine readable storage device comprises instructions for execution by a processor of the machine to further perform:
receiving tilt information from the pointing device; and
using the tilt information in combination with the unique hashed mapped zones within the field of view of the camera to determine a position of the tip of the pointing device in such zones.

16. A device comprising:
a processor; and
a memory device having a program stored thereon for execution by the processor to:
receive an image of a display surface from a pointing device having a camera with a field of view wider than a tip of the pointing device;
process the received image to identify an area on the display surface within the field of view of the camera; and
identify a position of the tip of the pointing device on the display surface as a function of the identified area on the display surface.

17. The device of example 16 wherein processing the received image to identify an area on the display surface comprises:
detecting markers displayed on the display surface corresponding to unique hashed mapped zones;
transforming pixel information in each mapped zone in the field of view into a hash; and
comparing the hashes to known hashes to identify a mapped zone and look up zone coordinates associated with the zone, wherein the position of the tip of the pen is calculated from the zone coordinates.

18. The device of example 17 wherein pixel information transformed into the hash comprises pixel brightness and color depth and wherein the markers comprise a marker pixel in each zone.

19. The device of any of examples 17-18 wherein each zone on the display has a hash stored in a memory device as the known hashes and its zone coordinate.

20. The device of any of examples 17-19 wherein the memory device program causes the processor to further:
receive tilt information from the pointing device; and
use the tilt information in combination with the unique hashed mapped zones within the field of view of the camera to determine a position of the tip of the pointing device in such zones.

21. A device comprising:
a display;
a processor operatively coupled to the display; and
a memory device having a program stored thereon for execution by the processor to:
receive an image of a display surface from a camera of a pointing device, the image having a field of view wider than a tip of the pointing device;
process the received image to identify an area on the display surface within the field of view of the camera; and
identify a position of the tip of the pointing device on the display surface as a function of the identified area on the display surface.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving an image of a display surface from a pointing device having a camera with a field of view wider than a tip of the pointing device;
processing the received image to identify an area on the display surface within the field of view of the camera; and
identifying a position of the tip of the pointing device on the display surface as a function of the identified area on the display surface, wherein processing the received image to identify an area on the display surface comprises:
detecting markers displayed on the display surface corresponding to unique hashed mapped zones;
transforming pixel information in each mapped zone in the field of view into a hash; and
comparing the hashes to known hashes to identify a mapped zone corresponding to the position of the tip of the pointing device.

2. The method of claim 1 wherein the image is received via processing circuitry that processes the image, identifies the position of the tip of the pointing device, and drives the display.

3. The method of claim 1 wherein pixel information transformed into the hash comprises pixel brightness and color depth.

4. The method of claim 1 wherein the markers comprise a marker pixel in each zone.

5. The method of claim 4 wherein marker pixel is less discernible to a human user.

6. The method of claim 1 wherein a pixel pattern is added to each zone having a non-unique hash until the hash for each zone is unique.

7. The method of claim 6 wherein each zone on the display has a hash stored in a memory device as the known hashes.

8. The method of claim 1 and further comprising:
receiving tilt information from the pointing device; and
using the tilt information in combination with the unique hashed mapped zones within the field of view of the camera to determine a position of the tip of the pointing device in such zones.

9. The method of claim 1 and further comprising dynamically adjusting a size of the zone to optimize accuracy of pen tip position, and to accommodate different resolutions of displays.

10. A non-transitory machine readable storage device having instructions for execution by a processor of the machine to perform:
receiving an image of a display surface from a pointing device having a camera with a field of view wider than a tip of the pointing device;
processing the received image to identify an area on the display surface within the field of view of the camera; and
identifying a position of the tip of the pointing device on the display surface as a function of the identified area on the display surface, wherein processing the received image to identify an area on the display surface comprises:
detecting markers displayed on the display surface corresponding to unique hashed mapped zones;
transforming pixel information in each mapped zone in the field of view into a hash: and
comparing the hashes to known hashes to identify a mapped zone corresponding to the position of the tip of the pointing device.

11. The non-transitory machine readable storage device of claim 10 wherein pixel information transformed into the hash comprises pixel brightness and color depth and wherein the markers comprise a marker pixel in each zone.

12. The non-transitory machine readable storage device of claim 10 wherein each zone on the display has a hash stored in a memory device as the known hashes.

13. The non-transitory machine readable storage device of claim 10 wherein the machine readable storage device comprises instructions for execution by a processor of the machine to further perform:
receiving tilt information from the pointing device; and
using the tilt information in combination with the unique hashed mapped zones within the field of view of the camera to determine a position of the tip of the pointing device in such zones.

14. A device comprising:
a processor; and
a memory device having a program stored thereon for execution by the processor to:
receive an image of a display surface from a pointing device having a camera with a field of view wider than a tip of the pointing device;
process the received image to identify an area on the display surface within the field of view of the camera; and
identify a position of the tip of the pointing device on the display surface as a function of the identified area on the display surface, wherein processing the received image to identify an area on the display surface comprises:

detecting markers displayed on the display surface corresponding to unique hashed mapped zones;

transforming pixel information in each mapped zone in the field of view into a hash; and comparing the hashes to known hashes to identify a mapped zone and look up zone coordinates associated with the zone, wherein the position of the tip of the pen is calculated from the zone coordinates.

15. The device of claim 14 wherein pixel information transformed into the hash comprises pixel brightness and color depth and wherein the markers comprise a marker pixel in each zone.

16. The device of claim 14 wherein each zone on the display has a hash stored in a memory device as the known hashes and its zone coordinate.

17. The device of claim 14 wherein the memory device program causes the processor to further:

receive tilt information from the pointing device; and use the tilt information in combination with the unique hashed mapped zones within the field of view of the camera to determine a position of the tip of the pointing device in such zones.

18. A device comprising:

a display;

a processor operatively coupled to the display; and a memory device having a program stored thereon for execution by the processor to:

receive an image of a display surface from a camera of a pointing device, the image having a field of view wider than a tip of the pointing device;

process the received image to identify an area on the display surface within the field of view of the camera; and identify a position of the tip of the pointing device on the display surface as a function of the identified area on the display surface, wherein processing the received image to identify an area on the display surface comprises:

detecting markers displayed on the display surface corresponding to unique hashed mapped zones;

transforming pixel information in each mapped zone in the field of view into a hash: and comparing the hashes to known hashes to identify a mapped zone and look up zone coordinates associated with the zone, wherein the position of the tip of the pen is calculated from the zone coordinates.

\* \* \* \* \*